(12) United States Patent
Parrault

(10) Patent No.: US 6,799,721 B2
(45) Date of Patent: Oct. 5, 2004

(54) CONTACT-FREE DISPLAY PERIPHERAL DEVICE FOR CONTACT-FREE PORTABLE OBJECT

(75) Inventor: Olivier Parrault, Golfe Juan (FR)

(73) Assignee: ASK S.A., Valbonne (FR)

( * ) Notice: Subject to any disclaimer, the term of this patent is extended or adjusted under 35 U.S.C. 154(b) by 101 days.

(21) Appl. No.: 10/069,377

(22) PCT Filed: Jun. 26, 2001

(86) PCT No.: PCT/FR01/02010

§ 371 (c)(1),
(2), (4) Date: Feb. 25, 2002

(87) PCT Pub. No.: WO02/01496

PCT Pub. Date: Jan. 3, 2002

(65) Prior Publication Data

US 2002/0105065 A1 Aug. 8, 2002

(30) Foreign Application Priority Data

Jun. 29, 2000 (FR) .............................................. 00 08438

(51) Int. Cl.$^7$ .............................................. G06K 15/00
(52) U.S. Cl. ........................................ 235/383; 705/20
(58) Field of Search ........................ 235/383, 491–492, 235/487; 343/856, 857, 595, 895; 307/104; 705/20–23

(56) References Cited

U.S. PATENT DOCUMENTS

| | | | |
|---|---|---|---|
| 4,818,853 A | * 4/1989 | Ohta et al. .................. | 235/492 |
| 4,851,654 A | * 7/1989 | Nitta .......................... | 235/492 |
| 5,198,647 A | 3/1993 | Mizuta ....................... | 235/449 |
| 5,699,074 A | 12/1997 | Sutherland et al. ........... | 345/90 |
| 5,751,257 A | 5/1998 | Sutherland ..................... | 345/2 |
| 5,971,587 A | * 10/1999 | Kato et al. ................... | 700/115 |
| 6,107,920 A | * 8/2000 | Eberhardt et al. ........ | 340/572.7 |
| 6,223,990 B1 | * 5/2001 | Kamei ......................... | 235/492 |
| 6,249,263 B1 | * 6/2001 | Kayser et al. ............... | 345/1.1 |
| 6,253,190 B1 | 6/2001 | Sutherland .................... | 705/20 |
| 6,269,342 B1 | 7/2001 | Brick et al. ................... | 705/20 |
| 6,378,774 B1 | * 4/2002 | Emori et al. ................. | 235/492 |
| 2001/0054005 A1 | * 12/2001 | Hook et al. ................... | 705/20 |
| 2002/0047781 A1 | * 4/2002 | Fallah ..................... | 340/572.1 |
| 2003/0109303 A1 | * 6/2003 | Takemoto et al. ............ | 463/25 |

FOREIGN PATENT DOCUMENTS

| | | |
|---|---|---|
| EP | 0 977 145 | 2/2000 |
| FR | 2 615 984 | 12/1988 |
| WO | WO 96/03713 | 2/1996 |
| WO | WO 99/38117 | 7/1999 |

* cited by examiner

Primary Examiner—Diane I. Lee
(74) Attorney, Agent, or Firm—James C. Lydon

(57) ABSTRACT

A peripheral display device for a portable contactless object such as a smart card (10) enabling information associated with the use of this portable object to be displayed. This peripheral device includes at least one chip, a display (16) and a receiver for receiving energy and information (18), not connected by an ohmic contact to the portable object. This receiver is a flat coil which plays the role of the secondary of a transformer, the primary of which is formed by the antenna (14) of the portable object, when the latter receives energy and information from a portable object reader via electromagnetic coupling.

11 Claims, 2 Drawing Sheets

CONTACT-FREE DISPLAY PERIPHERAL DEVICE FOR CONTACT-FREE PORTABLE OBJECT

This application is a U.S. National Stage of International Application PCT/FR01/02010, filed Jun. 26, 2001 and published on Jan. 3, 2002 in the French Language.

TECHNICAL FIELD

The present invention concerns peripheral objects for portable contactless objects such as smart cards, and particularly a contactless peripheral display device.

BACKGROUND ART

Portable objects, such as smart cards, contact or contactless type, are currently widely used in numerous applications. It generally entails ISO format cards which are coupled to readers, by which they are remotely supplied, that is, by which they receive energy in the form of a magnetic field and with which they communicate. In the transport sector, such systems, called remote toll cards, have been developed by all of motorway operators in order to provide users with subscription possibilities and to simplify toll booth payment operations. Users of such systems present the cards in front of readers which are installed in the toll booths. Communication thus occurs between the card and the reader. This communication enables user recognition and the corresponding sum to be deducted from the customer's account at the toll booth.

In public transport sectors, equivalent means have also be implemented in the form of ISO cards or in a smaller format such as tickets. Users present the subscription cards in front of readers in order to gain access to public transport. The communication which is established between the card and the reader enables user recognition and the cost of the trip to be deducted from the user's account.

These means have also been developed as a means of payment. This is the case, for example, of the electronic wallet. The latter can be used to pay for small purchases in shops. It consists of a smart card. This card is credited with money in a special distributor. The user may thus use the card to pay for purchases by presenting it in front of a reader. The communication established between the card and the reader debits the sum corresponding to the purchase from the card.

Many companies has also developed identification means for their personnel using contactless smart cards. Passing the card in front of a reader allows the cardholder to be identified, who is then granted or refused access to a controlled zone. The same card can also be used by employees to "punch in".

These various applications have given rise to the need of a peripheral display device on the card, enabling the user to retrieve the information contained in the chip, such as the available balance remaining after a transaction in the case of an electronic wallet or the number of trips still available on a transport card or even the number of hours worked, or the authorization or refusal to access areas reserved for the employees of a company. Such a peripheral device may also be used to supply the user with more technical information about the card's operation.

The solution commonly used is the integration of a liquid crystal display in the reader which informs the user that communication has been properly established and displays the information related to the communication. However, the drawback of having a display unit built into the reader is that the user can gain access to the information by passing the card in front of the reader. While this is not a problem in the case of an identification card, it becomes much more problematic in the case of an electric wallet or transport card. The user would like to be able to regularly consult his/her balance without having to find a payment terminal just to read the card.

A solution currently exists which entails the use of an additional badge which plays the role of both a card reader and display unit. It is in fact a sort of case in which the card is inserted. The reader provides power to the card by direct contact, which enables communication to take place between the card and the case. The information is then displayed on the screen of the case. The latter is used particularly for electronic wallet cards and allows the balance remaining on the card to be consulted at all times. The major drawback of these badges is their size. The cases are dimensioned to receive an ISO smart card. As such, contrary to a smart card, they cannot be carried in a wallet and must be carried in a pocket or purse.

Another drawback is that they require an internal power source. This power source is typically a battery which enables the case to read and display the information stored in the card. The power source must thus be renewed once it is depleted.

DISCLOSURE OF THE INVENTION

The purpose of the invention is to mitigate these drawbacks by supplying a contactless peripheral display for contactless portable objects, such as a smart card, having the capacity to display the information sent by the portable object reader or by the portable object itself, for a period of time long enough so that the user can consult it at all times, even when the portable object is not in the proximity of the reader, this display requiring only a small amount of energy to operate, or even no energy whatsoever.

The present invention concerns a peripheral display device for a contactless portable object such as a smart card enabling information associated with the use of this portable object to be displayed. This peripheral device includes at least one chip, a display means and a means for receiving energy and information, not connected by an ohmic contact to the portable object. This receiving means is a flat coil which plays the role of the secondary of a transformer, the primary of which is formed by the antenna of the portable object, when the latter receives energy and information from a portable object reader via electromagnetic coupling.

According to a special embodiment of the invention, this peripheral display device can be separated from the contactless object and features a bistable liquid crystal display screen.

BRIEF DESCRIPTION OF THE FIGURES

The purposes, objects and characteristics of the invention will become more apparent from the following description when taken in conjunction with the accompanying drawings in which.

DETAILED DESCRIPTION OF THE INVENTION

Figure 1:
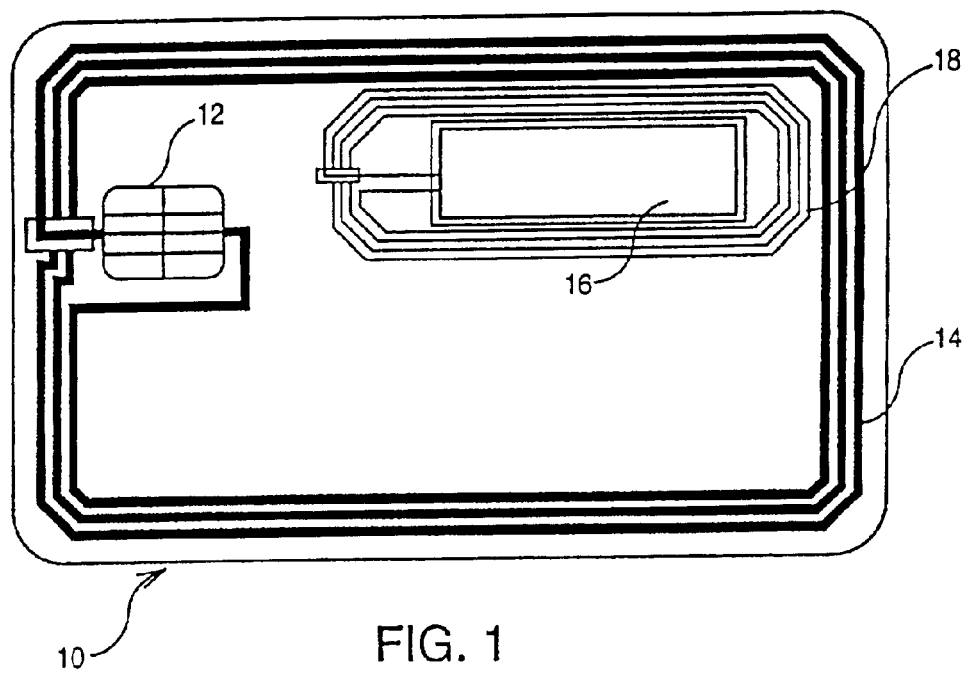
FIG. 1 represents an ISO format contactless smart card featuring a built-in peripheral display device.

The peripheral display device according to the invention may thus be installed on a contactless portable object such as a smart card. FIG. 1 represents an ISO format contactless smart card featuring a built-in peripheral display device. This card 10 consists of a chip 12. When the card is placed in the field of the reader, this chip enters into communication with the reader by means of the card's antenna 14. This antenna consists of turns of increasing circumference. Each of the ends of this antenna is connected to the chip 12. The peripheral display device 20 consists of a chip (not visible in the figure), a screen 16 and a flat coil 18 connected to the chip of the peripheral display device and formed by turns of increasing circumference. The size of this flat coil varies depending on the special characteristics of the card with which the peripheral display device operates. The peripheral display device operates only when magnetically coupled to the card, at the working frequency of the card's chip.

Figure 2:
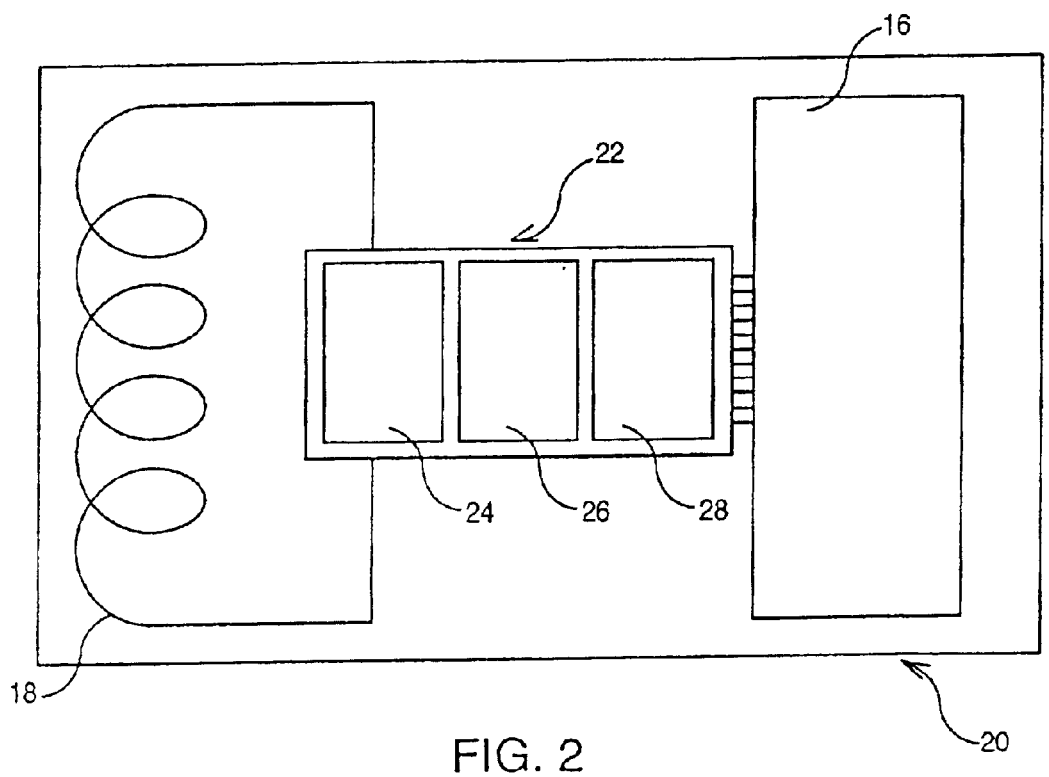
FIG. 2 represents a block diagram of the peripheral display device and its various components.

According to FIG. 2, the peripheral display device preferably consists of a chip 22, connected to the coil 18 and to the screen 16. The chip 22 is made up of 3 blocks: the analog block 24, the message decoding block 26 and the display block 28.

The role of the analog block 24 is to rectify and regulate the alternating signal, available on the terminals of the coil 18. This signal is created by a carrier signal of 13.56 megahertz (MHz), which is the coupling frequency between the contactless smart card and the reader, to generate the continuous supply voltage required to operate the peripheral display device. It shapes the main clock signals issued from this carrier frequency of 13.56 MHz, which enables the sequential operation of the peripheral display device. It extracts and transforms the superimposed data according to the amplitude modulation at the carrier frequency of 13.56 MHz, transmitted by the reader to the contactless smart card and the peripheral display device. It can modify the impedance which it presents to the coil 18, by switching a resistance, at a retromodulation subcarrier frequency issued from the main clock, in order to enable the transmission of data from the peripheral display device to the reader, by means of data modulating this subcarrier frequency (modulation of the coupling with the antennas directly opposite). According to a specific example, the value of the retromodulation subcarrier frequency is equal to 847 kilohertz (kHz) (standard currently used). It can also be configured to receive the data which will be transmitted on the retromodulation subcarrier frequency by the card's chip.

The peripheral device is also equipped with a message decoding block 26. This block is more or less complex. It may be a microcontroller, a simple decoder or even a hardwired logic circuit. This block is designed to separate and process the messages that are sent to it among those which transit via the carrier and subcarrier frequencies during communication between the coupler and the contactless card.

The display control block 28 is an interface circuit allowing the data received by the peripheral display device to be converted into signals which are compatible with the display technology used, consisting of the screen 16, in order to drive the corresponding pixels or segments.

As far as the coil 18 of the peripheral device is concerned, its dimensions are very variable and depend on the consumption and the voltage required to supply the peripheral device.

Thus, in the case of a peripheral display device having energy consumption much lower than that of the card's chip, the coil 18 of the peripheral display device will be much smaller in size than the antenna of the contactless card (see FIG. 1) In the case of a peripheral display device having energy consumption only slightly less than the chip of the contactless card, the coil may possibly be interlaced or superimposed on the antenna of the contactless card in order to benefit from better coupling.

The screen 16 is preferably a liquid crystal display screen.

Figure 3:
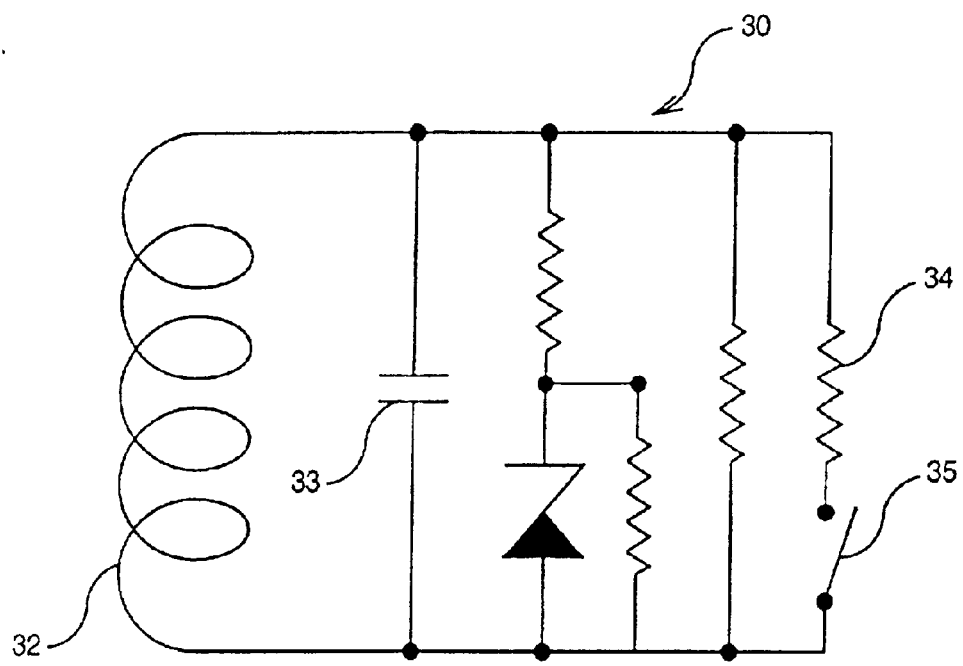
FIG. 3 represents the electrical schematic diagram of a contactless smart card.

FIG. 3 represents the electrical circuit diagram of the contactless smart card 30. It is characterized by its coupling antenna 32, at least one capacitor 33 enabling the card to have a tuning capacitor intervening in the coupling with the reader at the frequency of 13.56 MHz. It also includes several resistors, including at least one resistor 34 which can be switched with a switch 35 in order to generate a retromodulation frequency between the smart card and the reader.

Figure 4:
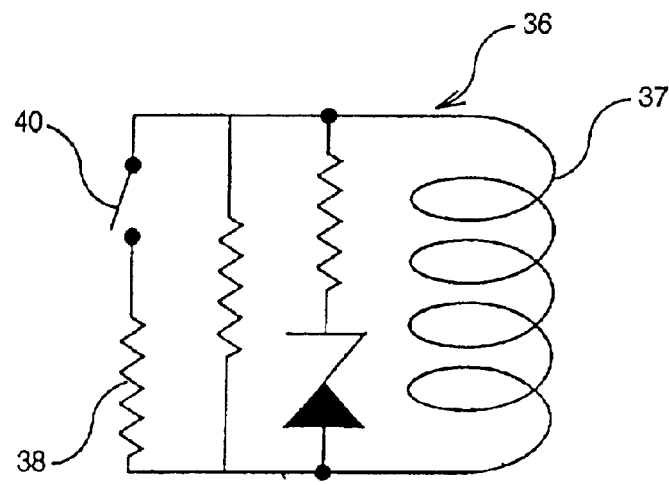
FIG. 4 represents the circuit diagram of a peripheral display device.

FIG. 4 represents the electrical circuit diagram of the peripheral display device 36. The latter is characterized by its flat coil 37. In order to be able to draw energy from the reader in order to operate the peripheral device, the principle is to use the main resonant circuit of the card 30 as the primary of a transformer. The flat coil 37 of the peripheral display device thus forms the secondary of this transformer and receives the energy and the information via electromagnetic coupling. The peripheral display device 36 also includes a resistor 38 which is switched by means of a switch 40 and thus modifies the impedance in order to generate a retromodulation subcarrier frequency. Actually, according to a specific operating mode, the impedance of the peripheral display device can be varied in order to transmit a response to the reader by means of retromodulation. This response is made by means of the contactless smart card's main resonant circuit. The peripheral display device may also communicate directly with the chip of the contactless smart card, depending on the retromodulation format and the type of retromodulator incorporated in it.

As shown in FIG. 4, the circuit of the peripheral display device 36 does not present a tuning capacitor. Thus, it cannot function as a standalone device. It must thus benefit from the overvoltage associated with the tuning of the contactless smart card with the reader, via coupling with the main antenna circuit.

As with all transformers, the impedance presented by the electronics of the peripheral display device can be compared to the impedance presented from the chip on the main antenna of the contactless card, on the basis of a coupling mutual surge impedance m between the main antenna and the flat coil and the ratio n1/n2, n1 being the number of turns of the contactless card's antenna and n2 being the number of turns of the antenna of the peripheral display device.

If the peripheral display device has a strong impedance and a very weak parasite capacitance in front of the rectifier, it may be supplied when the contactless card is within the reader's magnetic field, and without significantly downgrading the latter's operation.

According to an operating mode of the peripheral display device, the latter exploits the data generated by the contactless card's chip in the form of a specific instruction and emitted by the latter's main antenna. This instruction is generated once the transaction between the contactless card and the reader is accomplished.

According to another operating mode of said peripheral display device, the latter can exploit data which are dedicated to it and that it receives from the reader at the time of energy transmission, this data being transmitted in amplitude modulation to the contactless card, and then emitted by the card's main antenna.

According to another specific mode, the screen of the peripheral display device maintains an after-image. The information remains displayed on the screen after the transaction so that the user can see the information, up until the next transaction. This long-persistence screen may consist of a bistable liquid crystal screen. This recently developed technology consists in using liquid crystals which have the ability to remain in a certain state without consuming energy. These liquid crystals only use energy to change their state.

An alternative to using a bistable liquid crystal screen consists in using a peripheral display device which has at least one storage capacitor. In order to obtain a persistent image on the liquid crystal display, a sufficient voltage must be applied to the screen's terminals in order to maintain the liquid crystals in their state. One of the possibilities is to insert a capacitance into the peripheral display device which charges when the card is in the reader's magnetic field. The energy is transmitted to the capacitor after rectification by the flat coil of the peripheral display device which receives the information and the energy. The electric charge stored in the capacitor(s) is used to supply the screen and to thus maintain the liquid crystals in their state for an above average period of time between two passages of the contactless card in the reader's magnetic field.

Another alternative to obtain a persistent display is to use a battery. It is indeed possible to provide the peripheral device with a battery which is used to maintain the display. Preferably, a very thin "paper battery" is used.

Regardless of the means used to obtain a persistent display, the refreshing of the display is obtained exclusively when the contactless card is placed in the magnetic field of the reader when the information passes between the reader and the contactless card.

The contactless peripheral display device according to the invention can be integrated into the contactless card during its fabrication; in this case it cannot be separated from the card. It can also be affixed to a pre-existing contactless card, especially by using adhesive, and thus can be, in this case, separated from the contactless card.

In the case where the contactless peripheral display device can be separated from the contactless card, display refreshing is only possible if it is near the contactless card when it is placed in the magnetic field of the reader. The device according to the invention must be placed directly on the card or very near it.

The peripheral display device according to the invention thus consists of a contactless display device which is independent and not electrically connected to the chip of the contactless card. The interest in the independence of the peripheral display device is that it has no impact on the functionality of the contactless card nor on the transactions that are carried out between the card and the reader. In this manner, in the case where the peripheral display device is physically separated from the contactless card, a malfunction of either of the two devices has not impact on the other. One simply has to change the faulty device.

Such a device may be applied to telephone cards which will eventually become contactless. It could also be adapted to toll road payment cards in the future if they would be able to store money-credit or a number of toll booth passages in their memory.

What is claimed is:

1. A peripheral display device for display of information associated with the use of a contactless portable object, comprising
   at least one chip,
   a means for receiving energy and said information, said receiving means comprising a flat coil which is not connected by ohmic contact to said portable object,
   at least one energy storage means, and
   a display means,
   wherein an antenna of said portable object and the receiving means are capable of acting as the primary and secondary, respectively, of a transformer when said portable object receives energy and information from a reader of said portable object through electromagnetic coupling.

2. The peripheral display device of claim 1, wherein said energy and information transmitted by the antenna of said portable object are generated by said portable object reader.

3. The peripheral display device of claim 1, wherein said information transmitted by the antenna of said portable object is generated by the chip of said portable object.

4. The peripheral display device of claim 1, wherein said information transmitted by the antenna of said portable object are generated by the chip of said portable object.

5. The peripheral display device of claim 1, wherein said energy storage means is a capacitor.

6. The peripheral display device of claim 1, wherein said display means is capable of generating a persistent display, such that information remains displayed on said display means for a predetermined period of time.

7. The peripheral display device of claim 6, wherein the long-persistence display means is a bistable liquid crystal screen.

8. The peripheral display device of claim 6, wherein the display means is provided with a long-persistence screen feature due to energy stored in said energy storage means.

9. The peripheral display device of claim 1, wherein said device is integrated into said portable object, said flat coil being in the same plane as said antenna of said portable object.

10. The peripheral display device of claim 1, wherein said device can be separated from said portable object.

11. The peripheral display device of claim 1, wherein said device is capable of sending a response to said portable object reader by retromodulation, via said flat coil, coupled to the antenna of said portable object.

* * * * *